(12) United States Patent
Kim et al.

(10) Patent No.: US 10,094,715 B2
(45) Date of Patent: Oct. 9, 2018

(54) TEMPERATURE SENSOR CIRCUIT CAPABLE OF COMPENSATING FOR NONLINEAR COMPONENTS AND COMPENSATION METHOD FOR TEMPERATURE SENSOR CIRCUIT

(71) Applicant: Silicon Works Co., Ltd., Daejeon (KR)

(72) Inventors: Hyun Su Kim, Daegu (KR); Jong Kyoung Lee, Daegu (KR)

(73) Assignee: Silicon Works Co., Ltd., Daejeon (KR)

( * ) Notice: Subject to any disclaimer, the term of this patent is extended or adjusted under 35 U.S.C. 154(b) by 539 days.

(21) Appl. No.: 14/822,460

(22) Filed: Aug. 10, 2015

(65) Prior Publication Data
US 2017/0023416 A1    Jan. 26, 2017

Related U.S. Application Data

(63) Continuation of application No. PCT/KR2015/007582, filed on Jul. 21, 2015.

(51) Int. Cl.
*G01K 7/00* (2006.01)
*G01K 7/01* (2006.01)

(52) U.S. Cl.
CPC .................................... *G01K 7/01* (2013.01)

(58) Field of Classification Search
USPC ..................... 374/171, 172, 1, 178
See application file for complete search history.

(56) References Cited

U.S. PATENT DOCUMENTS 4,071,813 A    1/1978 Dobkin 5,195,827 A    3/1993 Audy et al.
(Continued)

FOREIGN PATENT DOCUMENTS

JP    2011-527009 A    10/2011
KR    10-0238776 B1    1/2000
(Continued)

OTHER PUBLICATIONS

Gummel, H.K. et al., "An Integral Charge Control Model of Bipolar Transistors", The Bell System Technical Journal (May-Jun. 1970), pp. 827-852.
(Continued)

*Primary Examiner* — Mirellys Jagan
(74) *Attorney, Agent, or Firm* — Mintz Levin Cohn Ferris Glovsky and Popeo, P.C.; Kongsik Kim; Jhongwoo Jay Peck

(57) ABSTRACT

A temperature sensor circuit and a compensation method for the temperature sensor circuit are disclosed herein. The temperature sensor circuit may provide a proportional-to-absolute temperature (PTAT) output signal with a compensation scheme. The temperature sensor circuit includes a first temperature sensor module circuit, a second temperature sensor module circuit, and an arithmetic operation circuit. The first temperature sensor module circuit generates a first temperature voltage signal based on a first reference current level. The second temperature sensor module circuit generates a second temperature voltage signal based on a second reference current level. The arithmetic operation circuit generates an output signal as PTAT voltage signal using the first temperature voltage signal and the second temperature voltage signal, eliminating reverse Early effect and High-level injection effect with simple arithmetic operation.

16 Claims, 15 Drawing Sheets

(56) References Cited

U.S. PATENT DOCUMENTS

| | | |
|---|---|---|
| 5,570,008 A | 10/1996 | Goetz |
| 5,966,006 A | 10/1999 | Migliavacca |
| 6,407,620 B1 | 6/2002 | Hirayama |
| 6,456,145 B1 | 9/2002 | Pertijs et al. |
| 6,542,020 B2 | 4/2003 | Pertus et al. |
| 6,784,746 B1 | 8/2004 | Wuppermann |
| 7,446,598 B2 | 11/2008 | Pertijs et al. |
| 7,674,035 B2 | 3/2010 | Pertijs et al. |
| 7,914,205 B2 | 3/2011 | Galli |
| 2003/0214336 A1* | 11/2003 | Watanabe ............. G01K 7/21 327/200 |
| 2004/0176199 A1* | 9/2004 | Overbay ............. F16H 15/22 474/153 |
| 2007/0030049 A1* | 2/2007 | Yoshikawa ........... G01K 7/01 327/512 |
| 2008/0165826 A1 | 7/2008 | Cheng et al. |
| 2010/0002747 A1 | 1/2010 | Bosch et al. |
| 2010/0002748 A1 | 1/2010 | Lin et al. |
| 2015/0063403 A1 | 3/2015 | Cho et al. |
| 2016/0126935 A1* | 5/2016 | Marinca ............. G05F 3/30 327/513 |

FOREIGN PATENT DOCUMENTS

| | | |
|---|---|---|
| KR | 10-2012-0116708 A | 10/2012 |
| KR | 20150027414 A | 3/2015 |

OTHER PUBLICATIONS

McAndrew, C. et al., "VBIC95: An Improved Verticle, IC Bipolar Transistor Model", IEEE (1995), pp. 170-177.

van Staveren, A. "The Influence of the Reverse Early Effect on the Performance of Bandgap References", IEEE, (1996), pp. 418-421.

Pertijs, M.A., "Precision Temperature Measurement Using CMOS Substrate PNP Transistors", IEEE Sensors Journal, vol. 4, No. 3 (Jun. 2004) pp. 294-300.

D. Celi, "About Modeling the Reverse Early Effect in HICUM Level 0", 6th European HICUM Workshop, (Jun. 12-13, 2006), Heilbronn, 21 pages.

* cited by examiner $I_C$ vs $V_{CE}$ on GP Model $I_C$ vs $V_{CE}$ on VBIC Model

TEMPERATURE SENSOR CIRCUIT CAPABLE OF COMPENSATING FOR NONLINEAR COMPONENTS AND COMPENSATION METHOD FOR TEMPERATURE SENSOR CIRCUIT

CROSS-REFERENCE TO RELATED APPLICATION

This application is a continuation of PCT/KR2015/007582 filed on Jul. 21, 2015, which application is incorporated herein by reference.

TECHNICAL FIELD

The present invention relates to a temperature sensor circuit capable of providing a proportional-to-absolute temperature (PTAT) output signal and a compensation method for the temperature sensor circuit. More particularly, the present invention relates to a temperature sensor circuit capable of compensating for nonlinear components, i.e., errors in which current-voltage characteristics (I-V characteristics) of transistors are different from those of an ideal case, and a compensation method for the temperature sensor circuit.

BACKGROUND ART

Recently, in many parts of automobiles, mechanical devices have been replaced with electronic devices. In this situation, the importance of automotive integrated circuits (ICs) for automotive applications has gradually increased.

The difficulty in the design of automotive ICs stems from the fact that a required operating temperature range is wider than that of common ICs. Generally, since the characteristics of a complementary metal-oxide semiconductor (CMOS) device vary depending on temperature, it is considerably difficult to design an integrated circuit (IC) that can maintain consistent functionality across a wide operating temperature range.

when the characteristics of an automotive IC are controlled based on temperature via a temperature sensor, it is possible to fabricate an automotive IC that can achieve high performance over a wide operating temperature range.

An example of a technology for controlling the characteristics and geometrical parameters of a semiconductor circuit using a temperature-dependent signal, as described above, is disclosed in Korean Patent No. 10-0871111 entitled "Temperature Compensated Transistor Device and Temperature Compensation Method."

The technology disclosed in the above Korean patent is intended to provide a transistor device whose core transistor characteristics are not influenced by operating temperature and a use and temperature compensation method in an IC semiconductor circuit for the transistor device.

According to the technology disclosed in the above Korean patent, there is provided an IC in which a temperature sensor generates a temperature-dependent signal and even the geometrical parameters of the transistor are controlled in response to a temperature-dependent signal, with the result that core characteristics exposed to the outside of the transistor are not influenced by temperature.

However, although it is preferred that the temperature sensor used in the above technology provides a signal linearly dependent on temperature in an ideal case, an effort to improve the linearity of the temperature sensor itself is required due to intrinsic temperature-dependent nonlinear components that the temperature sensor itself has.

A commonly widely used temperature sensor generates a temperature-dependent signal based on the base-emitter voltage difference $\Delta VBE$ of a bipolar junction transistor (BJT) pair. Meanwhile, nonlinear components attributable to forward Early effect, reverse Early effect, and high-level injection appear in the $\Delta VBE$-based temperature sensor. Although there are conventional technologies that attempt to compensate for forward Early effect and reverse Early effect in order to generate a linearly temperature-dependent signal by compensating for nonlinear components, it is difficult for most of these conventional technologies to obtain an accurately compensated signal unless nonlinear components attributable to Early effect are quantitatively estimated. However, it is very difficult due to the intrinsic nonlinear components of the transistor to quantitatively estimate the nonlinear components attributable to Early effect.

Meanwhile, a circuit in which a differential output stage or a current mirror is connected behind a $\Delta VBE$-based temperature sensor has been researched. An example of such a circuit is disclosed in U.S. Pat. No. 6,784,746 entitled "Circuit and Method for Correcting Thermal Deviations of One or More Output signals from an Amplifier with Early Effect Compensation."

However, even with the technology disclosed in the above U.S. patent, it is difficult to generate a consistent, linear temperature-dependent signal in a wide operating bias condition that causes high-level injection.

SUMMARY OF THE DISCLOSURE

Accordingly, the present invention has been made to solve the above problems occurring in the prior art, and an object of the present invention is to provide a temperature sensor that can compensate for errors in the analog domain and be thus used in a analog application requiring high accuracy without requiring a digital-analog converter (DAC), and that can be used via passage through a general analog-digital converter (ADC) in the case of a digital application, thereby achieving high accuracy in both an analog application and a digital application.

An object of the present invention is to compensate for the nonlinear error of a temperature-dependent signal, i.e., the output of a temperature sensor, in the analog domain. That is, a linearly temperature-dependent signal can be obtained by directly eliminating nonlinear components in the analog domain, and thus the following additional digital signal processing and the following additional analog or digital circuits are intended to be reduced.

An object of the present invention is to provide a temperature sensor circuit that can cancel nonlinear components via an arithmetic operation between signals without a need to quantitatively estimate nonlinear components attributable to reverse Early effect.

An object of the present invention is to provide a temperature sensor circuit that is consistently and linearly proportional to absolute temperature even in an operation condition, such as a high-level injection state.

An object of the present invention is to significantly increase the degree of freedom in circuit design in connection with the areas of elements, such as a transistor, a resistor, etc., and the like because a digital-analog converter (DAC) circuit is not included and thus the number of factors that should be considered in the design of a temperature sensor circuit is small. Furthermore, for the same reason, the number of constraints in the design of a temperature sensor circuit is small, and thus the performance of a circuit is intended to be easily optimized.

An object of the present invention is to provide a circuit that can generate a linear temperature-dependent signal from which nonlinear components have been eliminated in the analog domain via two BJT pairs in different bias conditions and an arithmetic operation between the temperature-dependent voltage signals of the BJT pairs, and a compensation method using the circuit.

In accordance with an aspect of the present invention, there is provided a temperature sensor circuit, including: a first temperature sensor module circuit configured to generate a first temperature voltage signal, having a positive correlation with temperature, based on a first reference current level; a second temperature sensor module circuit configured to generate a second temperature voltage signal, having a positive correlation with the temperature, based on a second reference current level different from the first reference current level; and an arithmetic operation circuit configured to generate an output signal, i.e., a voltage signal proportional to the temperature, using the first temperature voltage signal and the second temperature voltage signal, wherein the arithmetic operation circuit generates the output signal, from which the components of the first temperature voltage signal and the second temperature voltage signal, nonlinearly influenced by the temperature, have been eliminated, by performing an arithmetic operation on the first temperature voltage signal and the second temperature voltage signal.

The second reference current level may be a current level that allows the second temperature sensor module circuit to have a high-level injection state.

The components nonlinearly influenced by the temperature may include components attributable to high-level injection effects respectively corresponding to the first reference current level and the second reference current level, or components attributable to reverse Early effects respectively corresponding to the first reference current level and the second reference current level.

The arithmetic operation circuit may multiply the first temperature voltage signal by a first coefficient and the second temperature voltage signal by a second coefficient having a value different from that of the first coefficient, and may eliminate components, nonlinearly influenced by the temperature, by performing an arithmetic operation on the first temperature voltage signal multiplied by the first coefficient and the second temperature voltage signal multiplied by the second coefficient. The first reference current level may have a positive correlation with the temperature by means of a current source having a characteristic of being dependent on the temperature.

The current source having the characteristic of being dependent on the temperature may include a temperature-dependent component having a quadratic or higher order temperature term.

In accordance with another aspect of the present invention, there is provided a compensation method for a temperature sensor circuit, the compensation method including: generating, by a first temperature sensor module circuit to which a first reference current level pair has been applied, a first temperature voltage signal having a positive correlation with temperature; generating, by a second temperature sensor module circuit to which a second reference current level pair different from the first reference current level pair has been applied, a second temperature voltage signal having a positive correlation with the temperature; and generating an output signal, i.e., a voltage signal from which components nonlinearly influenced by the temperature have been eliminated and which is proportional to the temperature, by performing an arithmetic operation on the first temperature voltage signal and the second temperature voltage signal.

The compensation method may further include providing the first reference current level pair and the second reference current level pair, each having a positive correlation with the temperature, by means of current sources each having the characteristic of being dependent on temperature, and may further include providing the second reference current level pair by multiplying the first reference current level pair by a proportional constant.

The generating the second temperature voltage signal may include generating the second temperature voltage signal, having a positive correlation with the temperature, based on the second reference current level that allows the second temperature sensor module circuit to have a high-level injection state.

The generating the output signal may include: multiplying the first temperature voltage signal by a first coefficient; multiplying the second temperature voltage signal by a second coefficient having a value different from that of the first coefficient; and eliminating components, nonlinearly influenced by the temperature, by performing an arithmetic operation between the first temperature voltage signal multiplied by the first coefficient and the second temperature voltage signal multiplied by the second coefficient.

In accordance with another aspect of the present invention, there is provided a temperature sensor circuit, including: a first temperature sensor module circuit configured to include a first transistor configured such that a first reference current is applied thereto via an emitter terminal thereof and a second transistor configured such that a second reference current is applied thereto via an emitter terminal thereof, and to generate a first temperature voltage signal using the difference between the first base-emitter voltage of the first transistor and the second base-emitter voltage of the second transistor; a second temperature sensor module circuit configured to include a third transistor configured such that a third reference current is applied thereto via an emitter terminal thereof and a fourth transistor configured such that a fourth reference current is applied thereto via an emitter terminal thereof, and to generate a second temperature voltage signal using the difference between the third base-emitter voltage of the third transistor and the fourth base-emitter voltage of the fourth transistor; and an arithmetic operation circuit configured to generate an output signal as a voltage signal proportional to temperature based on the first temperature voltage signal and the second temperature voltage signal.

The ratio between the first reference current and the third reference current is equal to the ratio between the second reference current and the fourth reference current, and the ratio between the first reference current and the second reference current is equal to the ratio between the third reference current and the fourth reference current.

The arithmetic operation circuit may include a subtractor configured to perform a subtraction between a signal obtained by multiplying the first temperature voltage signal by a first coefficient and a signal obtained by multiplying the second temperature voltage signal by a second coefficient; and the first coefficient and the second coefficient may have different values.

The first reference current may be applied by a current source having the characteristic of being dependent on the temperature.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, detailed descriptions of related well-known components or functions that may unnecessarily make the gist of the present invention obscure will be omitted.

The prevent invention is not limited to the embodiments. Throughout the accompanying drawings, the same reference symbols are assigned to the same components.

Figure 1A:
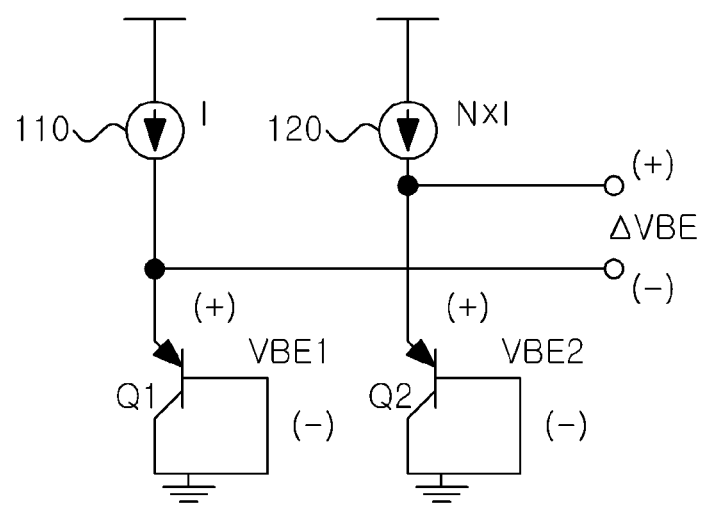
FIGS. 1A, 1B, and 1C are a circuit diagram and characteristic graphs of a temperature sensor module circuit according to an embodiment of the present invention.
Figure 1B:
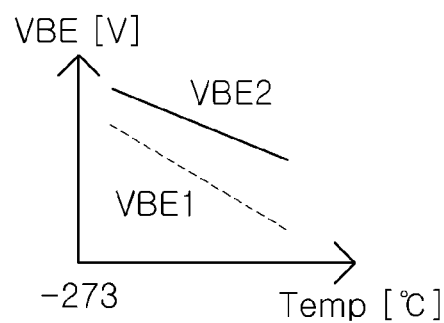
Figure 1C:
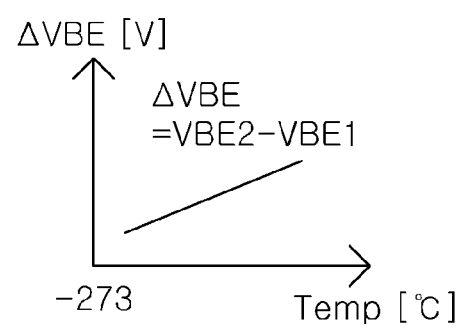

FIGS. 1A, 1B, and 1C are a circuit diagram and characteristic graphs of a temperature sensor module circuit according to an embodiment of the present invention.

The temperature sensor module circuit using PNP-type bipolar transistors BJTs, shown in FIG. 1, uses two current sources 110 and 120 and two transistors Q1 and Q2. The current sources 110 and 120 are connected to respective emitter terminals of the transistors Q1 and Q2, and the base and collector terminals of the transistors Q1 and Q2 are connected to each other and then connected to a ground GND.

In this case, the current sources 110 (I) and 120 (I×N) have different current levels, and the current source 120, i.e., the bias current source of the transistor Q2, may have a current level N times that of the current source 110, i.e., the bias current source of the transistor Q1. The ratio N between the current levels of the two current sources 110 and 120 functions as the proportional constant of the temperature-current characteristics of the temperature sensor module circuit. In the temperature sensor module circuit, a single bipolar transistor pair (BJT pair) constitutes a single sensor, and thus it is simple to implement a multi-node.

In general, the base-emitter voltage VBE of a bipolar transistor exhibits the characteristic of gradually decreasing as the temperature increases. Referring to FIG. 1B, although the base-emitter voltage VBE1 of the transistor Q1 of the temperature sensor module circuit and the base-emitter voltage VBE2 of the transistor Q2 thereof maintain linearity with respect to temperature, the rates of change of VBE1 and VBE2 with respect to temperature vary depending on the bias current levels.

Accordingly, using the difference between the base-emitter voltages VBEs of the transistors Q1 and Q2 biased at different bias currents by the current sources 110 and 120, a delta base-emitter voltage ΔVBE, i.e., a voltage signal linearly dependent on temperature, can be obtained, which is shown in FIG. 1C. This may be derived based on the ideal assumption that the VBEs of the transistors Q1 and Q2 maintain linearity that is proportional to temperature.

The voltage signal dependent on temperature is the most fundamental signal available for a temperature sensor. The temperature-dependent voltage signal ΔVBE may be expressed by Equation 1 below:

$$\Delta VBE = VBE2 - VBE1 = V_T * \ln\left(\frac{I_{C2}}{I_{C1}}\right) = \frac{kT}{q} * \ln(N) \quad (1)$$

where q is the charge of an electron, k is a Boltzmann constant, $V_T$ is a thermal voltage, and N is the current ratio between the bias currents of the transistors Q1 and Q2.

According to Equation 1, the temperature-dependent voltage signal ΔVBE is the product of $V_T$ and the log function of the current ratio N, and thus it can be seen that the temperature-dependent voltage signal ΔVBE is a signal that linearly increases with respect to temperature.

However, Equation 1 is a relation that is valid when the transistors Q1 and Q2 operate under ideal conditions. In practice, various nonlinear characteristics are present, and thus the temperature-dependent voltage signal ΔVBE has the characteristic of deviating from Equation 1.

An example of these nonlinear and non-ideal characteristics is Early effect.

Figure 2A:
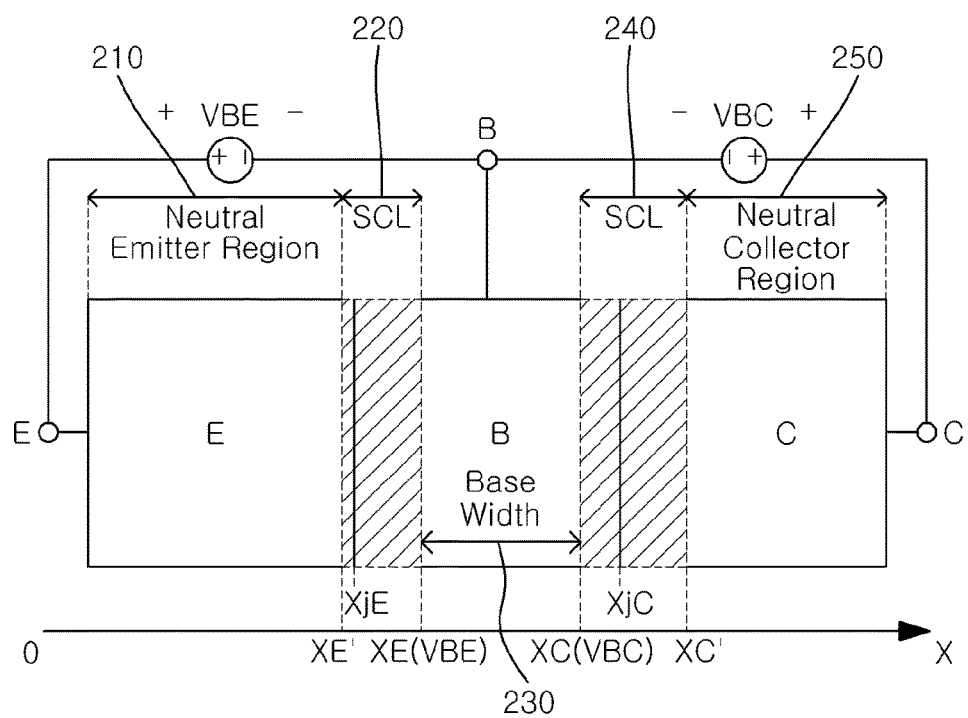
FIGS. 2A and 2B are schematic diagrams showing a bipolar transistor in order to describe Early effect.
Figure 2B:
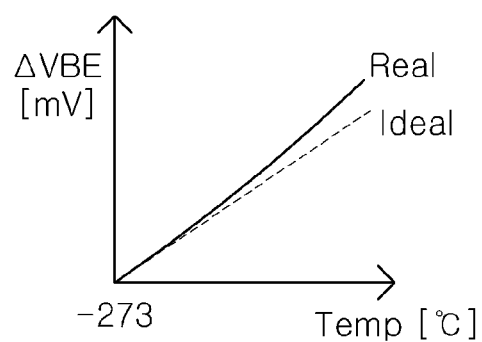

FIGS. 2A and 2B are schematic diagrams showing a bipolar transistor in order to describe Early effect.

Early effect is a representative error that occurs in a general bipolar transistor device. Meanwhile, in a circuit for generating a temperature-dependent voltage using a BJT pair, as shown in FIG. 1A, reverse Early effect error exerts an important influence. Reverse Early effect error occurs because the current-voltage (I-V) characteristics of the bipolar transistor are different from those of an ideal case. In this case, ideal collector current $I_C$ may be expressed by Equation 2 below:

$$I_C = I_S * \exp\left(\frac{VBE}{V_T}\right) \quad (2)$$

where $I_C$ is a saturation current. $I_C$ may be expressed by Equation 3 below:

$$I_S = \frac{q^2 n_i^2 A_E^2 D_B}{Q_B} \quad (3)$$

where q is the unit charge of an electron, $n_i$ is an intrinsic carrier concentration, $D_B$ is an effective minority-carrier diffusion constant in a base, $A_E$ is the area of a base-emitter junction, and $Q_B$ is a charge in a neutral base.

The space charge layer (SCL) 220 of the base-emitter junction is influenced by the base-emitter voltage VBE. In particular, the base-side boundary XE of the SCL 220 is a function of VBE, and is thus represented by XE(VBE). The SCL 240 of the base-collector junction is influenced by base-emitter voltage VBC. In particular, the base-side boundary XC of the SCL 240 is a function of VBC, and is thus represented by XC(VBC).

SCLs 220 and 240 are formed, and thus the width of a base region 230 is narrowed. The widths of the SCLs 220 and 240 are presented by functions of VBE and VBC, as described above. Accordingly, the charge $Q_B$ stored in the base is influenced by VBE and VBC.

In general, an operation is performed in the state in which VBE is a forward bias and VBC is a reverse bias. Accordingly, the influence of base-width modulation attributable to VBE is referred to as forward Early effect, and the influence of base-width modulation attributable to VBC is referred to as reverse Early effect.

It is well known that in the case of a temperature sensor circuit, such as that shown in FIG. 1A, there is no change in VBE, and thus the reverse Early effect exerts a stronger influence than the forward Early effect.

A well-known technology for mathematically modeling the reverse Early effect is the Gummel-Poon (GP) model. The GP model is also called an integral charge control BJT model, and was introduced in the paper "An Integral Charge Control Model of Bipolar Transistors," H. K. Gummel and H. C. Poon, Bell System Technical Journal, pp. 827-851, 1970.

When the GP model is applied, the collector current $I_C$ may be expressed by Equation 4 below:

$$I_C = I_{SS} * \exp\left(\frac{qVBE}{kT}\right) * \frac{1}{q_b} \quad (4)$$

where $I_{SS}$ is $I_S$ in the case of a zero bias, and $q_b$ is a value obtained by normalizing the base charge $Q_B$ using the base charge $Q_{BO}$ in the case of a zero bias, i.e., a normalized base charge.

The normalized base charge $q_b$ is expressed and approximated by Equation 5 below in the GP model in which a common bias condition is assumed to be applied:

$$q_b = \frac{q_1}{2} * \left(1 + \sqrt{1+4q_2}\right) \cong q_1 = \left(1 + \frac{VBE}{V_B} + \frac{VBC}{V_A}\right) \quad (5)$$

In the GP model, $q_1$ is the model coefficient of base width modulation, and $q_2$ is the model coefficient of high-level injection effect. Assuming that a common bias condition is applied, $q_2$ is negligible, and thus an approximation, such as that of Equation 5, can be made.

In this case, $V_A$ is a forward Early voltage, and $V_B$ is a reverse Early voltage. Since under general operating conditions, it can be assumed that the forward Early voltage $V_A$ is sufficiently higher than the reverse Early voltage $V_B$, the term $$"\frac{VBC}{V_A}"$$

is negligible in Equation 5.

Now, to consider the Early effect for the temperature sensor circuit of FIG. 1A, the difference in VBE between the transistors Q1 and Q2 is modeled. The normalized base charge used to model the collector current of the transistor Q1 may be referred to as $q_{b1}$, and the normalized base charge used to model the collector current of the transistor Q2 may be referred to as $q_{b2}$.

In this case, it is assumed that the forward Early voltage $V_A$ is sufficiently high and thus the forward Early effect is negligible. Furthermore, it is assumed that the reverse Early voltage $V_{B1}$ is sufficiently higher than the base-emitter voltage VBE1 of the transistor Q1 and the reverse Early voltage $V_{B2}$ is sufficiently higher than the base-emitter voltage VBE2 of the transistor Q2.

When Equation 4 is modified using $q_{b1}$ and $q_{b2}$ and the above assumptions are used, the difference ΔVBE in VBE between the transistors Q1 and Q2 may be expressed and approximated by Equation 6 below:

$$\Delta VBE = V_T * In(N) + V_T * In\left(\frac{q_{b2}}{q_{b1}}\right) = \quad (6)$$

$$V_T * In(N) + V_T * In\left(\frac{1 + \frac{VBE2}{V_B}}{1 + \frac{VBE1}{V_B}}\right) \cong V_T * In(N) +$$

$$V_T * \left(\frac{VBE2}{V_B} - \frac{VBE1}{V_B}\right) = V_T * In(N) + V_T * \frac{V_T In(N)}{V_B}$$

When Equation 6 is rewritten, ΔVBE, Real, i.e., the actual temperature-dependent voltage signal of the temperature sensor circuit of FIG. 1A, has both an ideal temperature-dependent linear component and a temperature-dependent nonlinear component attributable to the reverse Early effect, and may be expressed by Equation 7 below:

$$\Delta VBE, \text{Real} = V_T * In(N) + V_T * \frac{V_T In(N)}{V_B} \quad (7)$$

Figure 3A:
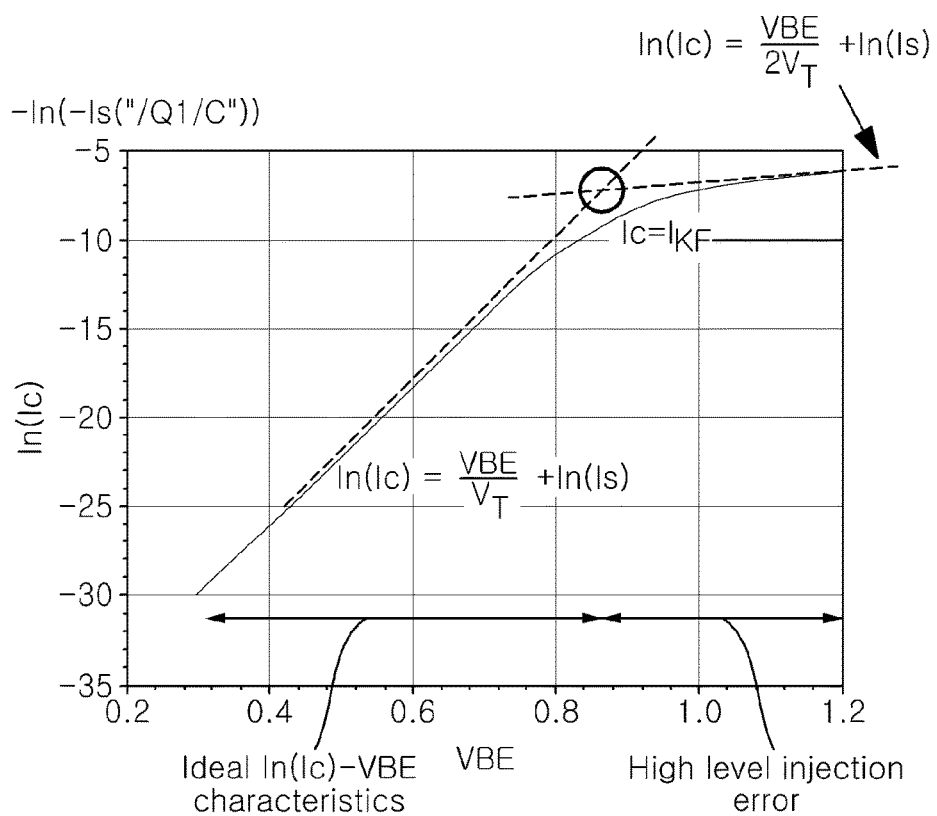
FIGS. 3A, 3B, and 3C are graphs showing a bias region, in which reverse Early effect and high-level injection effect appear, and errors attributable to the respective effects.
Figure 3B:
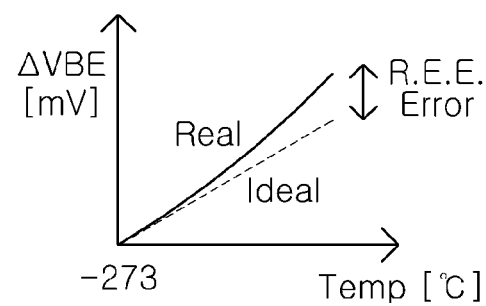
Figure 3C:
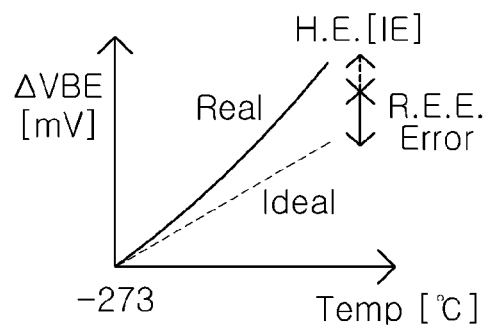

FIGS. 3A, 3B, and 3C are graphs showing a bias region, in which the reverse Early effect and the high-level injection effect appear, and errors attributable to the respective effects.

Referring to FIG. 3A, it can be seen that under a relatively low VBE condition, I-V characteristics close to the I-V characteristics of Equation 2 appear regardless of the reverse Early effect. However, when the current level increases because VBE increases above a predetermined level, a state called high-level injection is entered, and thus I-V characteristics in this case become different from those in the case of a VBE condition in which I-V characteristics are low.

Referring to FIG. 3A, the asymptotic curve of I-V characteristics in a low VBE condition and the asymptotic curve of I-V characteristics in a high-level injection state are shown. A threshold current $I_{KF}$ in the high-level injection state can be found via the intersection of the two asymptotic curves. That is, when the current $I_C$ of the transistor is equal to or higher than $I_{KF}$ as VBE increases, it is considered that a high-level injection state has been entered.

Referring to FIG. 3B, it can be seen that when a low VBE and a current bias are applied to the temperature sensor of FIG. 1A, reverse Early effect (R.E.E.) error is dominant in a temperature-dependent voltage signal ΔVBE.

Referring to FIG. 3C, it can be seen that the temperature sensor of FIG. 1A is in a high-level injection state, an R.E.E. error and a high-level injection error (H.E.) appear together. In this case, the high-level injection error varies depending on the emitter current level. That is, it may be assumed that the high-level injection error is a function of the emitter current level.

Referring to FIG. 3C, the temperature-dependent voltage signal ΔVBE output by the temperature sensor of FIG. 1A may be expressed by Equation 8 below:

$$\Delta VBE = V_T * \ln(N) + V_T * \left( V_T * \frac{\ln(N)}{V_B} \right) + H.E.[IE] \tag{8}$$

where H.E.[IE] is a term indicating that the high-level injection error is a function of an emitter current level IE. Referring to Equation 8, it can be seen that the temperature-dependent voltage signal ΔVBE output by the temperature sensor of FIG. 1A has an ideal temperature-dependent linear component, an Early effect error term adapted to be a temperature-dependent nonlinear component and unrelated to the emitter current, and a high-level injection effect error term influenced by the emitter current.

Figure 4:
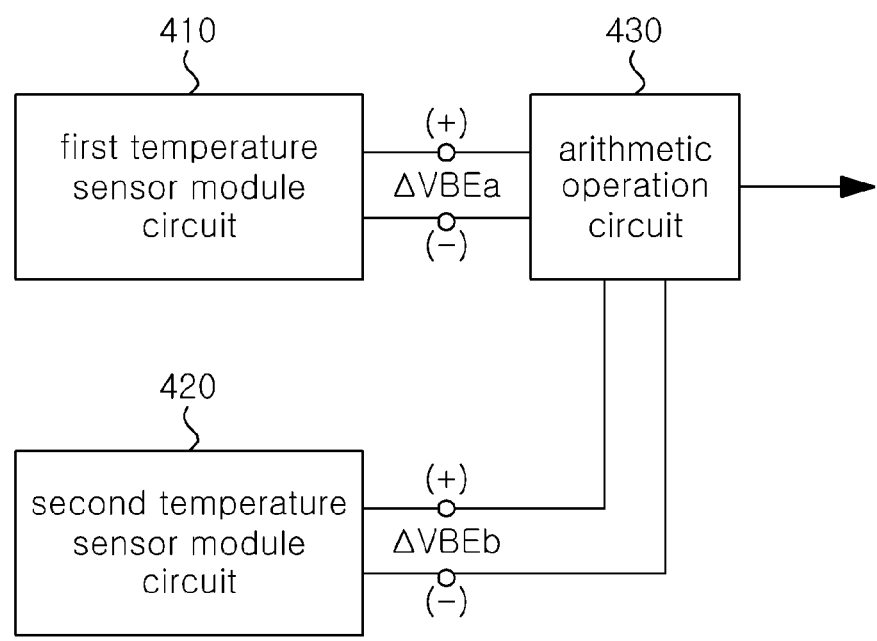
FIG. 4 is a block diagram showing a temperature sensor circuit according to an embodiment of the present invention.

FIG. 4 is a block diagram of a temperature sensor circuit according to an embodiment of the present invention.

The temperature sensor circuit according to the present embodiment includes a first temperature sensor module circuit 410, a second temperature sensor module circuit 420, and an arithmetic operation circuit 430.

The first temperature sensor module circuit 410 generates a first temperature voltage signal ΔVBEa having a positive correlation with temperature, and the second temperature sensor module circuit 420 generates a second temperature voltage signal ΔVBEb having a positive correlation with temperature. In this case, the first temperature voltage signal ΔVBEa and the second temperature voltage signal ΔVBEb have different temperature-dependent nonlinear components. The arithmetic operation circuit 430 generates an output signal using the first temperature voltage signal ΔVBEa and the second temperature voltage signal ΔVBEb. The output signal is a PTAT voltage signal. The arithmetic operation circuit 430 generates a PTAT voltage signal, from which nonlinear components have been eliminated by cancelling the different temperature-dependent nonlinear components of the first temperature voltage signal ΔVBEa and the second temperature voltage signal ΔVBEb, as an output signal.

The first temperature voltage signal ΔVBEa and the second temperature voltage signal ΔVBEb may include linear components proportional to absolute temperature and nonlinear components nonlinearly influenced by absolute temperature. Although the nonlinear components are originally not intended, the characteristics and magnitudes of the nonlinear components may be adjusted with intended ranges by controlling the bias conditions of the first temperature sensor module circuit 410 and the second temperature sensor module circuit 420.

A temperature sensor circuit according to an embodiment of the present invention may adjust the characteristics and magnitudes of nonlinear components within intended ranges by controlling the bias conditions of the first temperature sensor module circuit 410 and the second temperature sensor module circuit 420, and may eliminate the adjusted nonlinear components included in the first temperature voltage signal ΔVBEa and the second temperature voltage signal ΔVBEb via the arithmetic operation of the arithmetic operation circuit 430.

The ratio of the bias current of the BJT pair constituting part of the first temperature sensor module circuit 410 and the ratio of the bias current of the BJT pair constituting part the second temperature sensor module circuit 420 may be designed to have the value "N." In this case, the first temperature voltage signal ΔVBEa and the second temperature voltage signal ΔVBEb have characteristics, such as that of Equation 8.

Since the high-level injection error H.E.[IE] is a function of the emitter current, and varies depending on the bias current level. For example, the bias conditions may be set such that the first temperature sensor module circuit 410 has the characteristics of FIG. 3B and the second temperature sensor module circuit 420 has the characteristics of FIG. 3C. Referring to Equations 7 and 8, an error attributable to the reverse Early effect has a value proportional to only temperature regardless of the bias condition, and thus it appears in the first temperature voltage signal ΔVBEa and the second temperature voltage signal ΔVBEb in the same manner. Meanwhile, to obtain an error attributable to the high-level injection effect, a subtraction operation between the first temperature voltage signal ΔVBEa and the second temperature voltage signal ΔVBEb may be performed. However, to obtain the error attributable to the high-level injection effect using the result of the subtraction operation, the influence that the emitter current IE exerts on the error attributable to the high-level injection effect can be compensated for and a signal linearly proportional to temperature can be generated only if the influence that the emitter current IE exerts on the error attributable to the high-level injection effect has been analyzed.

In contrast, a voltage signal linearly proportional to temperature from which all nonlinear components have been eliminated by multiplying the first temperature voltage signal ΔVBEa and the second temperature voltage signal ΔVBEb by different coefficients, respectively, and performing an arithmetic operation on them, may be obtained as an output signal of the arithmetic operation circuit 430. According to this method, it may be possible to cancel error components via the arithmetic operation of the arithmetic operation circuit 430 and generate a signal linearly proportional to temperature without a need to obtain an error H.E.[IE] attributable to the high-level injection effect based on each emitter current IE.

Figure 5:
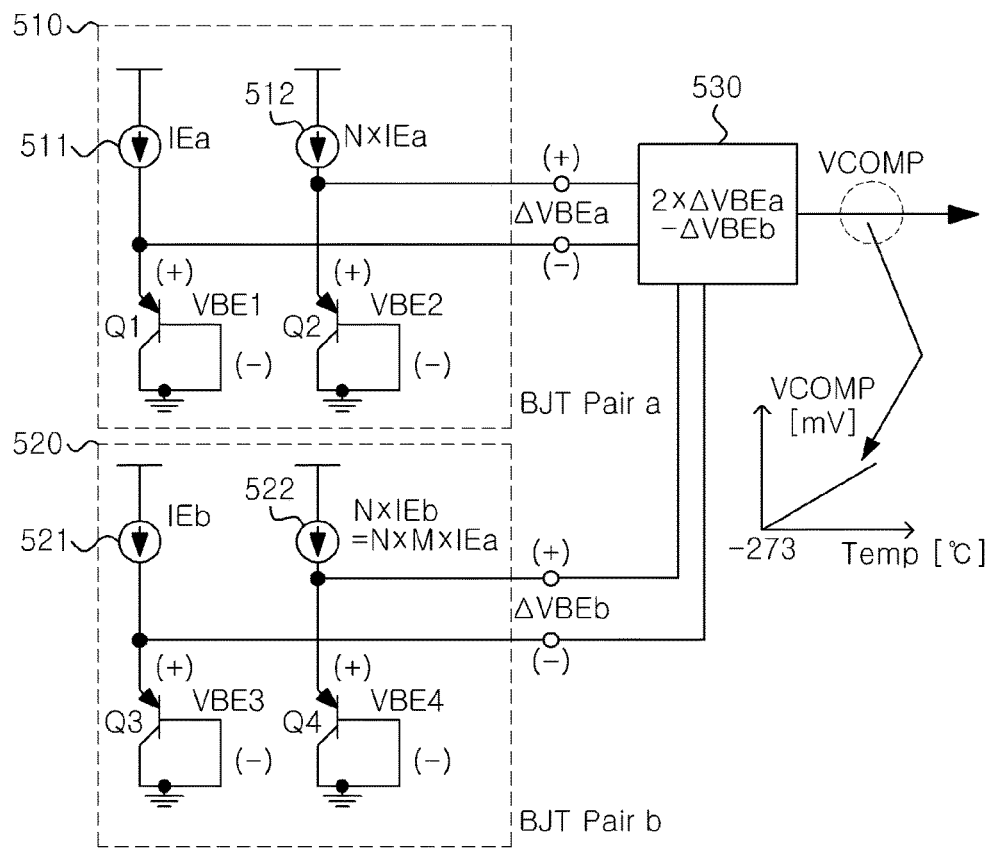
FIG. 5 is a circuit diagram showing a temperature sensor circuit according to an embodiment of the present invention.

FIG. 5 is a circuit diagram showing a temperature sensor circuit according to an embodiment of the present invention.

Referring to FIG. 5, the temperature sensor circuit according to the present embodiment includes a first temperature sensor module circuit 510, a second temperature sensor module circuit 520, and an arithmetic operation circuit 530.

A case where each of the first temperature sensor module circuit 510 and the second temperature sensor module circuit 520 is configured in a topology, such as the two-bipolar transistor pair shown in FIG. 1A. The first temperature sensor module circuit 510 includes two transistors Q1 and Q2 and two current sources 511 and 512, and the second temperature sensor module circuit 520 includes two transistors Q3 and Q4 and two current sources 521 and 522.

The first current source 511 of the first temperature sensor module circuit 510 is connected to the emitter of the first transistor Q1, and a first bias current IEa is applied from the first current source 511 to the emitter of the first transistor Q1. Furthermore, the second current source 512 is connected to the emitter of the second transistor Q2, and a second bias current N×IEa is applied from the second current source 512 to the emitter of the second transistor Q2.

The first temperature sensor module circuit 510 generates a first temperature voltage signal ΔVBEa using the difference between the first base-emitter voltage VBE1 of the first transistor Q1 and the second base-emitter voltage VBE2 of the second transistor Q2.

The third current source 521 of the second temperature sensor module circuit 520 is connected to the emitter of the third transistor Q3, and a third bias current IEb is applied from the third current source 521 to the emitter of the third transistor Q3. Furthermore, the fourth current source 522 is connected to the emitter of the fourth transistor Q4, and a fourth bias current N×IEb is applied from the fourth current source 522 to the emitter of the fourth transistor Q4. The first temperature voltage signal ΔVBEa of the first temperature sensor module circuit 510 and the second temperature voltage signal ΔVBEb of the second temperature sensor module circuit 520 are the basis for the generation of an output signal VCOMP. Accordingly, the linear components of the temperature-voltage characteristics of the first temperature voltage signal ΔVBEa and the second temperature voltage signal ΔVBEb are designed to be the same. Accordingly, N, i.e., the variable of the linear component of the ideal temperature-voltage characteristics expressed by Equation 1, is set to the same value in the first temperature sensor module circuit 510 and the second temperature sensor module circuit 520. That is, in the first temperature sensor module circuit 510 and the second temperature sensor module circuit 520, the ratio between two bias currents is designed to be N, which is the same value.

The bias current level pair IEa and N×IEa of the two current sources 511 and 512 of the first temperature sensor module circuit 510 may be described using the ratio N between two bias currents if the first bias current IEa is known. Accordingly, for ease of description, the first bias current IEa may be referred to as a first reference current, and the bias current level pair IEa and N×IEa of the first temperature sensor module circuit 510 may be referred to as a first reference current level pair.

In the same manner, the bias current level pair IEb and N×IEb of the two current sources 521 and 522 of the second temperature sensor module circuit 520 may be described using the ratio N between the two bias currents if the third bias current IEb is known. Accordingly, the third bias current IEb may be referred to as a second reference current, and the bias current level pair IEb and N×IEb of the second temperature sensor module circuit 520 may be referred to as a second reference current level pair.

Meanwhile, when the ratio between the first reference current and the second reference current is defined as M, the third bias current IEb may be represented by IEb=M×IEa.

The second temperature sensor module circuit 520 generates the second temperature voltage signal ΔVBEb using the difference between the third base-emitter voltage VBE3 of the third transistor Q3 and the fourth base-emitter voltage VBE4 of the fourth transistor Q4.

The arithmetic operation circuit 530 generates an output signal VCOMP, i.e., a PTAT signal, using the first temperature voltage signal ΔVBEa generated by the first temperature sensor module circuit 510 and the second temperature voltage signal ΔVBEb generated by the second temperature sensor module circuit 520.

In this case, the arithmetic operation circuit 530 may include a subtractor that performs a subtraction between a signal obtained by multiplying the first temperature voltage signal ΔVBEa by a first coefficient and a signal obtained by multiplying the second temperature voltage signal ΔVBEb by a second coefficient. In this case, the first coefficient and the second coefficient have different values. Although FIG. 5 represents the first coefficient as 2 and the second coefficient as 1 for ease of description, the notation is not necessarily limited to that of FIG. 5.

Figure 6:
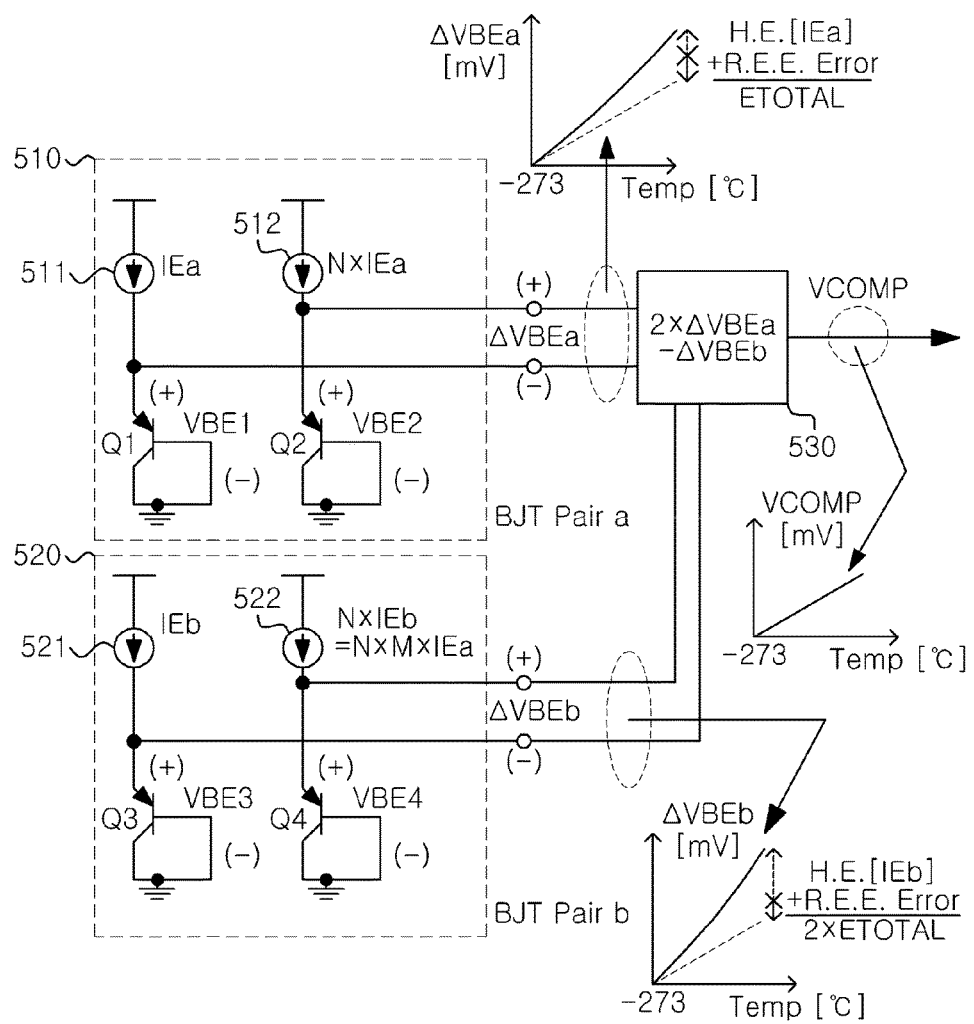
FIG. 6 is a circuit diagram showing a temperature sensor circuit according to an embodiment of the present invention and the operation thereof.

FIG. 6 is a circuit diagram showing both the temperature sensor circuit shown in FIG. 5 and the operations of temperature voltage signals in the temperature sensor circuit.

Referring to FIG. 6, a case where the first temperature voltage signal ΔVBEa has a non-linearity error component in a form shown in FIG. 3B, and the second temperature voltage signal ΔVBEb has a non-linearity error component in a form shown in FIG. 3C. A case where a design is made such that the second reference current IEb of the second temperature sensor module circuit 520 is set to be M times that of the first reference current IEa of the first temperature sensor module circuit 510, and thus the high-level injection effect is shown to be prominent in the second temperature sensor module circuit 520.

For example, when a nonlinear component (a reverse Early effect error+H.E.[IE]) derived from Equation 8 for the first temperature voltage signal ΔVBEa is denoted as ETOTAL, the bias current levels of the first temperature sensor module circuit 410 and the second temperature sensor module circuit 420 may be controlled such that a nonlinear component derived for the second temperature voltage signal ΔVBEb becomes 2×ETOTAL.

Thereafter, the arithmetic operation circuit 430 may subtract ΔVBEb from a signal twice ΔVBEa, thereby cancelling all non-linearity errors and thus obtaining only linear components. This process may be expressed by Equations 9 and 10 below:

$$\Delta VBEa = V_T * (N) + V_T * \left(V_T * \frac{ln(N)}{V_B}\right) + H.E.[IEa] \quad (9)$$

$$\Delta VBEb = V_T * (N) + V_T * \left(V_T * \frac{ln(N)}{V_B}\right) + H.E.[IEb]$$

The related equation of the first temperature voltage signal ΔVBEa may be obtained by substituting the first reference current level IEa of the first temperature sensor module circuit 510 into Equation 8, and the related equation of the second temperature voltage signal ΔVBEb may be obtained by substituting the second reference current level IEb of the second temperature sensor module circuit 520 into Equation 8.

Since the second reference current level IEb is higher than the first reference current level IEa as described above, the high-level injection effect H.E.[IEb] attributable to the second reference current level IEb is greater than the high-level injection effect H.E.[IEa] attributable to the first reference current level IEa.

$$2\Delta VBEa - \Delta VBEb = V_T * ln(N) + V_T * \left(V_T * \frac{ln(N)}{V_B}\right) + \quad (10)$$
$$(2H.E.[IEa] - H.E.[IEb])$$
$$\cong V_T * ln(N)$$

When the nonlinear component included in the first temperature voltage signal ΔVBEa in Equation 9 is denoted as ETOTAL, the second reference current level IEb may be controlled such that the nonlinear component included in the second temperature voltage signal ΔVBEb becomes 2×ETOTAL.

When the arithmetic operation circuit 530 subtracts the second temperature voltage signal ΔVBEb from a signal twice the first temperature voltage signal ΔVBEa, the nonlinear components ETOTAL are cancelled, and thus an output signal VCOMP in which only linear components remain may be generated.

Although the case where the output signal VCOMP is generated by subtracting the second temperature voltage signal ΔVBEb from a signal twice the first temperature voltage signal ΔVBEa is illustrated in the embodiment of FIG. 6, the idea of the present invention is not limited to this embodiment. The configuration of the arithmetic operation of the arithmetic operation circuit 530 may be determined depending on the sizes of the nonlinear components attributable to the reverse Early effects and the nonlinear components H.E.[IEa] and H.E.[IEb] attributable to the high-level injection effects among the nonlinear components of Equation 9.

Another embodiment of the present invention, in which the arithmetic operation of the arithmetic operation circuit 530 is configured to be simple and voltage signals linearly proportional to absolute temperature are obtained using current sources having temperature-dependent characteristics, is described below.

Figure 7A:
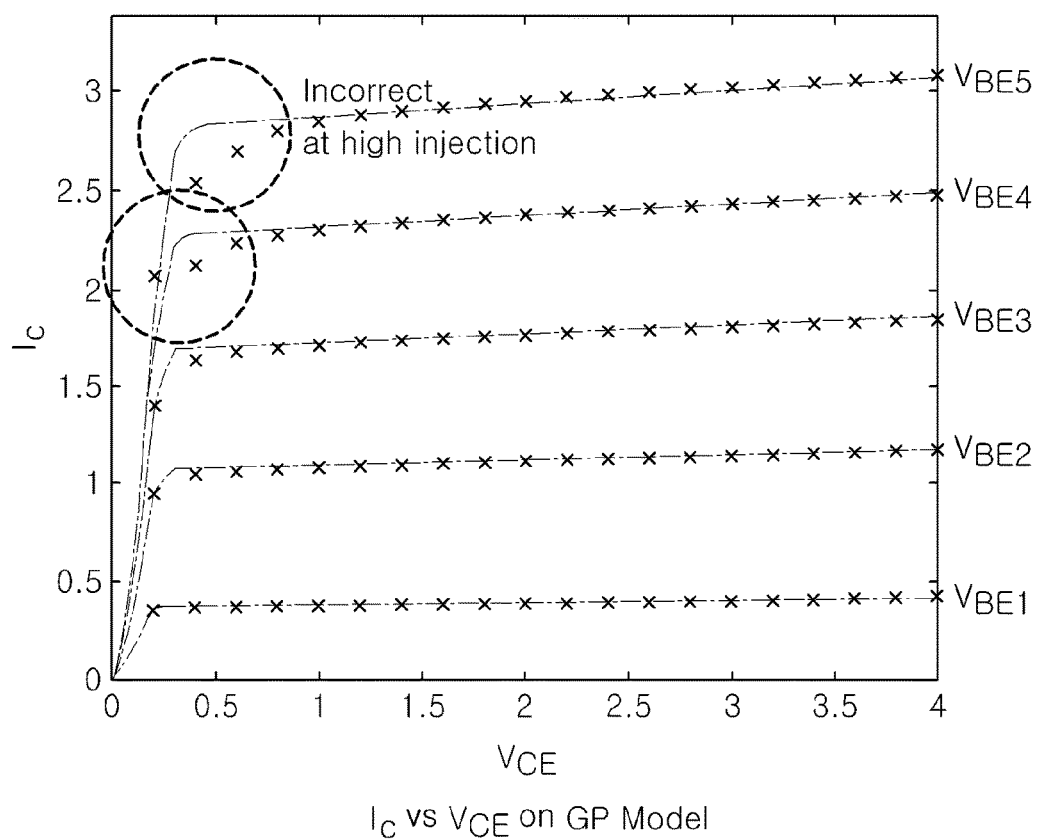
FIGS. 7A and 7B show I-V characteristic curves illustrating analytical models of the relationships between the collector-emitter voltage and collector current of a bipolar transistor.
Figure 7B:
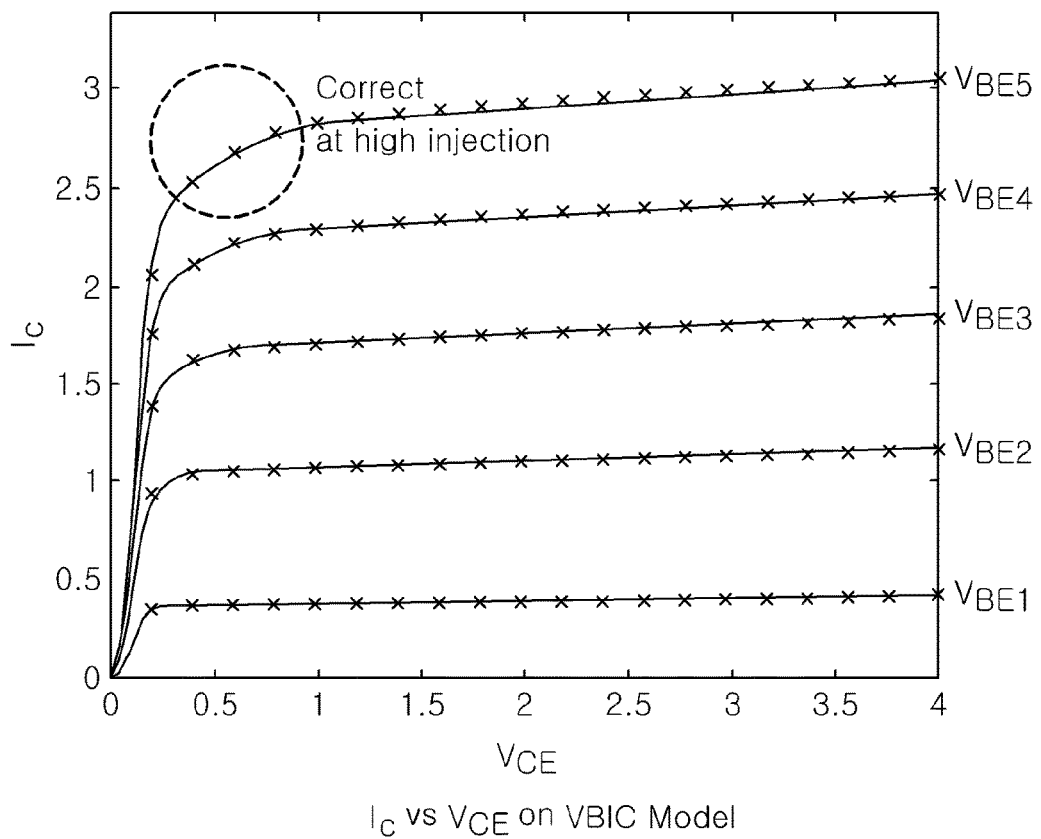

FIGS. 7A and 7B show I-V characteristic curves illustrating analytical models of the relationships between the collector-emitter voltage and collector current of a bipolar transistor.

Referring to FIGS. 7A and 7B, the GP model and the VBIC model, i.e., well-known analytical models, are introduced in order to illustrate errors attributable to high-level injection effects.

The GP model described in conjunction with Equation 5 was introduced in the 1970s, and describes a nonlinear component based on temperature using a normalized base charge $q_b$.

Meanwhile, the VBIC model was introduced in "VBIC95: An improved vertical, IC bipolar transistor model", Colin McAndrew, BCTM, 1995, and is capable of more precisely modeling $q_b$.

FIG. 7A is a graph plotting collector currents against collector-emitter voltages under various base-emitter voltage conditions. I-V characteristic curves predicted by the GP model are shown in the form of alternate long and short dash lines, and measured data is indicated by the marker "x."

It can be seen that when a collector current $I_C$ is higher than a threshold value $I_{KF}$, an error occurs between an I-V characteristic curve predicted by the GP model and measured data. That is, this means that the GP model cannot accurately predict I-V characteristics attributable to high-level injection effect.

FIG. 7B is a graph plotting collector currents against collector-emitter voltages under various base-emitter voltage conditions. In this drawing, an I-V characteristic curve predicted by the VBIC model is also shown. I-V characteristic curves predicted by the VBIC model are shown in the form of solid lines, and measured data is indicated by the marker "x."

Referring to FIG. 7B, it can be seen that even when a collector current $I_C$ is higher than a threshold value $I_{KF}$, a prediction made by the VBIC model is closer to measured data than a prediction made by the GP model.

Referring to Equation 5 again, a normalized base charge $q_b$ may be described using $q_1$ and $q_2$. The influence attributable to the Early effect may be described by $q_1$, and the influence attributable to the high-level injection effect may be described by $q_2$.

Accordingly, to analytically model the influence attributable to the high-level injection effect, Equation 5 may be calculated partially using the GP model and the VBIC model, with $q_1$ and $q_2$ not having been approximated. As a result, Equation 5 may be rewritten as Equation 11 below:

$$q_b = \frac{q_1}{2} * (1 + (1 + 4q_2)^{nkf}) \quad (11)$$

In this case, the model coefficient $q_1$ attributable to the reverse Early effect is calculated by Equation 12 below:

$$q_1 = \left(1 + \frac{VBE}{V_B}\right) \quad (12)$$

where $V_B$ is a reverse Early voltage.

Meanwhile, the model coefficient $q_2$ attributable to the high-level injection effect is approximated by Equation 13 below:

$$q_2 = \frac{\alpha IE}{I_{KF}} q_b \quad (12)$$

where α is the forward current gain of the bipolar transistor, i.e., a value obtained by dividing the collector current $I_C$ by the emitter current IE, and is close to 1, and $I_{KF}$ is the threshold current of a high-level injection region.

In Equation 11, the exponent "nkf" is a rational number dependent on the process. nkf is calculated as 0.5 in the GP model, while nkf is calculated as 0.407 in the VBIC model.

The error attributable to the high-level injection effect may be derived as a function of the emitter current IE by means of Equation 11 to which the GP Model and the VBIC Model have been partially applied. In this case, to approximate Equation 11, $4IE\ q_b \ll I_{KF}$ is assumed. Based on this assumption, Equation 11 may be expanded using a Taylor series. Equation 11 may be expanded using a Taylor series, and may then be approximated, as in Equation 14 below:

$$q_b = \frac{q_1}{2} * \left(1 + \left(1 + \frac{4\alpha IE}{I_{KF}} q_b\right)^{nkf}\right) \cong \frac{q_1}{2} * \left(1 + \left(1 + nkf * \frac{4\alpha IE}{I_{KF}} q_b\right)\right) \quad (14)$$

When Equation 14 is arranged for $q_b$, $q_b$ may be expressed as a function of the emitter current IE, as in Equation 15 below:

$$q_b[IE] = \frac{q_1}{1 - 2*nkf * \frac{\alpha IE}{I_{KF}} * q_1} \quad (15)$$

When Equation 15, instead of Equation 5, is substituted into Equation 6 representative of the difference ΔVBE in the base-emitter voltage between the transistors Q1 and Q2, and an arrangement is performed such that a linear component, a nonlinear component attributable to the reverse Early effect, and nonlinear component attributable to the high-level injection effect are distinguished from one another, as in Equation 8, Equation 16 below is found:

$$\Delta VBE = V_T * ln(N) + V_T * ln\left(\frac{q_{b2}}{q_{b1}}\right) = \quad (16)$$

$$V_T * ln(N) + V_T * ln\left(\frac{q_{1,2}}{q_{1,1}}\right) + V_T * ln\left(\frac{1 - 2nkf * \frac{\alpha_1 IE}{I_{KF}} * q_{1,1}}{1 - 2nkf * \frac{\alpha_2 * N * IE}{I_{KF}} * q_{1,2}}\right)$$

The normalized base charge of the transistor Q1 is $q_{b1}$, and a modeling coefficient into which the reverse Early effect has been incorporated is $q_{1,1}$. The normalized base charge of the transistor Q2 is $q_{b2}$, and a modeling coefficient into which the reverse Early effect has been incorporated is $q_{1,2}$. In this case, it is assumed that the emitter current of the transistor Q1 is IE and the emitter current of the transistor Q2 is N*IE.

In this case, when 4 IE $q_b \ll I_{KF}$ is assumed and the last term of Equation 16 is expanded using a Taylor series, Equation 16 may be approximated, as in Equation 17:

$$\Delta VBE \cong V_T * ln(N) + V_T * ln\left(\frac{q_{1,2}}{q_{1,1}}\right) + V_T * \frac{2nkf}{I_{KF}} \alpha IE(N-1) \cong \quad (17)$$

$$V_T * ln(N) + (V_T)^2 * \left(\frac{ln(N)}{V_B}\right) + V_T * \frac{2nkf}{I_{KF}} \alpha IE(N-1)$$

When Equation 17 is compared with Equation 8, an error H.E.[IE] attributable to the high-level injection effect may be described, as in the last term of Equation 17. The last term of Equation 17 is represented in the form of a function of the temperature and the emitter current IE.

Referring to FIGS. 5 and 6 again, when the characteristic in which the second reference current IEb is M times the first reference current IEa is used and the condition in which the nonlinear component of Equation 10 (the sum of the nonlinear component attributable to the reverse Early effect and the nonlinear component attributable to the high-level injection effect) becomes 0 and is cancelled is obtained, Equation 18 below is formulated:

$$2H.E.[IEa] - H.E.[IEb] + V_T * \left(V_T * \frac{ln(N)}{V_B}\right) = 0 \quad (18)$$

$$V_T * \frac{2nkf}{I_{KF}} \alpha(N-1)((2-M) * IEa) + V_T * \left(V_T * \frac{ln(N)}{V_B}\right) = 0$$

When IEa that satisfies Equation 18 is found, IEa, which is a function of temperature T, may be expressed by Equation 19 below:

$$IEa[T] = V_T * \frac{\frac{ln(N)}{V_B}}{\frac{2nkf}{I_{KF}} \alpha(N-1)(M-2)} \quad (19)$$

where $V_B$, nkf, $I_{KF}$ and α are parameters dependent on the semiconductor process, N is the current ratio of the BJT pair, and M is the ratio between IEa and IEb. N and M can be adjusted, which has been described above.

When the arithmetic operation of the arithmetic operation circuit 530 is simplified as 2*ΔVBEa−ΔVBEb as described above, a temperature sensor circuit capable of compensating for all nonlinear components attributable to the reverse Early effect and the high-level injection effect may be implemented by designing the current source 511 having a magnitude characteristic represented by a function of the temperature T and also designing the current sources 512, 521 and 522 having magnitudes N, M and N*M times that of the current source 511.

Figure 8:
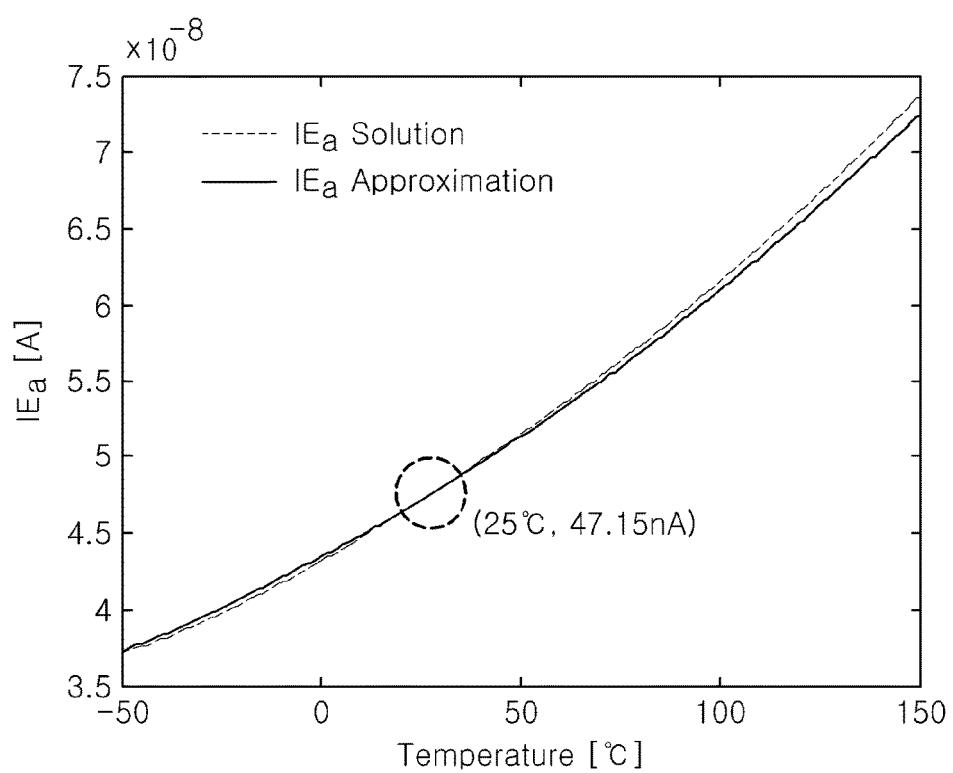
FIG. 8 shows temperature-current characteristic curves of the bias current source of a temperature sensor circuit according to an embodiment of the present invention.

FIG. 8 shows temperature-current characteristic curves of the bias current source of a temperature sensor circuit according to an embodiment of the present invention.

Referring to FIG. 8, the temperature-current characteristics of the current of the current source 511 having temperature-dependent characteristics according to Equation 19, i.e., the first reference current IEa, are shown.

Referring to FIG. 8, the solution of the first reference current IEa (IEa solution) to Equation 19 and the approximate value of IEa (IEa approximation) are shown. Since it is difficult to implement an accurate solution to Equation 19 using a circuit, IEa approximated up to the quadratic temperature coefficient of Equation 19 may be expressed by Equation 20 below:

$$IEa,\text{aprx} = 47.15 \text{ nA}*(1+TC_1*(T-298K)+TC_2*(T-298K)^2) \quad (20)$$

The approximation of IEa shown in FIG. 8 is illustrated using the condition $TC_1 = 3.356 \times 10^{-3}$ and $TC_2 = 7.5 \times 10^{-6}$.

Figure 9:
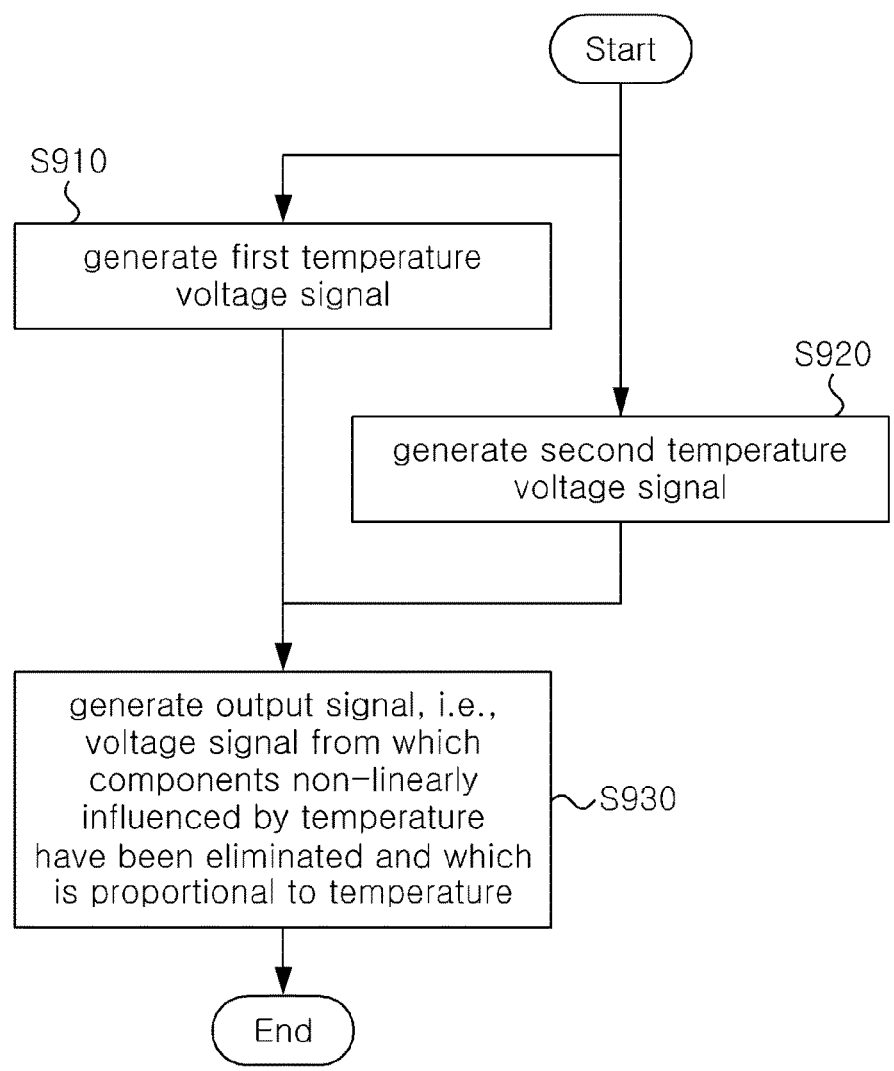
FIG. 9 is an operation flowchart showing a compensation method for a temperature sensor circuit according to an embodiment of the present invention.

FIG. 9 is an operation flowchart showing a compensation method for a temperature sensor circuit according to an embodiment of the present invention.

The compensation method for a temperature sensor circuit according to the present embodiment includes step S910 of generating a first temperature voltage signal ΔVBEa having a positive correlation with temperature by means of a first temperature sensor module circuit including a first transistor pair to which a first reference current level pair I and N×I has been applied, and step S920 of generating a second temperature voltage signal ΔVBEb having a positive correlation with temperature by means of a second temperature sensor module circuit including a second transistor pair to which a second reference current level pair different from the first reference current level pair has been applied.

The second reference current level pair may be M×I and M×N×I. The adjustment coefficient M of the second reference current level pair may be derived from a bias condition that allows the second temperature sensor module circuit to have a high-level injection state.

In this case, the first reference current level pair and the second reference current level pair may be configured by proportionally duplicating a current source having the same temperature-current characteristic. That is, the first reference current level pair I and N×I may be configured using a current source having a value of I[T] and a current source duplicated to be N times I[T], and the second reference current level pair M×I and M×N×I may be configured using a current source duplicated to be M times I[T] and a current source duplicated to be M×N times I[T].

Each of the temperature-dependent temperature voltage signals ΔVBEa and ΔVBEb includes nonlinear components attributable to the high-level injection effect and the reverse Early effect corresponding to the bias conditions of the first reference current level IEa and the second reference current level IEb.

The compensation method for a temperature sensor circuit according to the present embodiment further includes S930 of generating an output signal, from which a component nonlinearly influenced by temperature has been eliminated and which is a voltage signal proportional to temperature, by performing an arithmetic operation on the first temperature voltage signal ΔVBEa and the second temperature voltage signal ΔVBEb.

Figure 10:
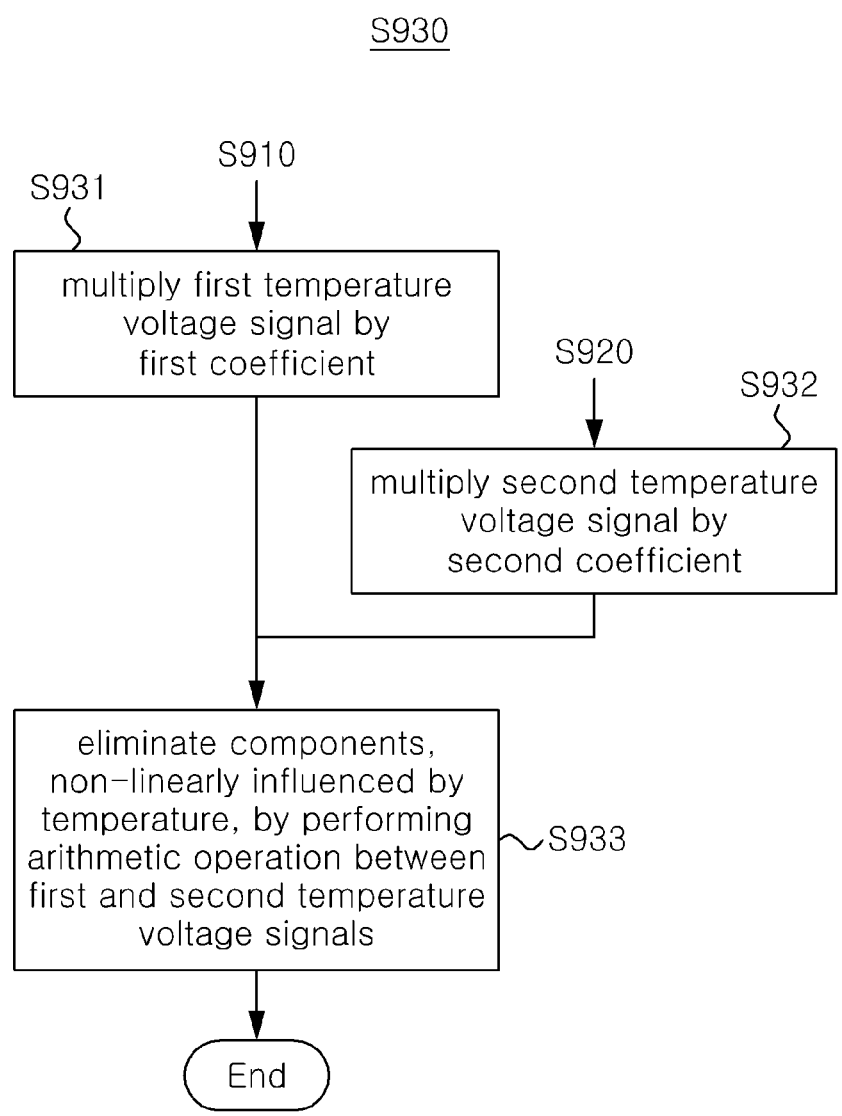
FIG. 10 is a detailed operation flowchart showing step S930 shown in FIG. 9.

FIG. 10 is a detailed operation flowchart showing step S930 shown in FIG. 9.

Step S930 includes step S931 of multiplying the first temperature voltage signal ΔVBEa by a first coefficient, and step S932 of multiplying the second temperature voltage signal ΔVBEb by a second coefficient having a value different from that of the first coefficient. Step S930 further includes step S933 of eliminating components, nonlinearly influenced by temperature, by performing an arithmetic operation between the first temperature voltage signal ΔVBEa multiplied by the first coefficient and the second temperature voltage signal ΔVBEb multiplied by the second coefficient. In this case, since the high-level injection level errors of the first temperature voltage signal ΔVBEa and the second temperature voltage signal ΔVBEb are different from each other, the sum of a nonlinear component and a reverse Early effect (R.E.E) error is controlled to be ETOTAL in ΔVBEa and to be 2×ETOTAL in ΔVBEb. When an arithmetic operation is performed on the first temperature voltage signal ΔVBEa and the second temperature voltage signal ΔVBEb adjusted as described above with a first coefficient set to 2 and a second coefficient set to 1, an output signal proportional to temperature may be generated at step S933.

Figure 11:
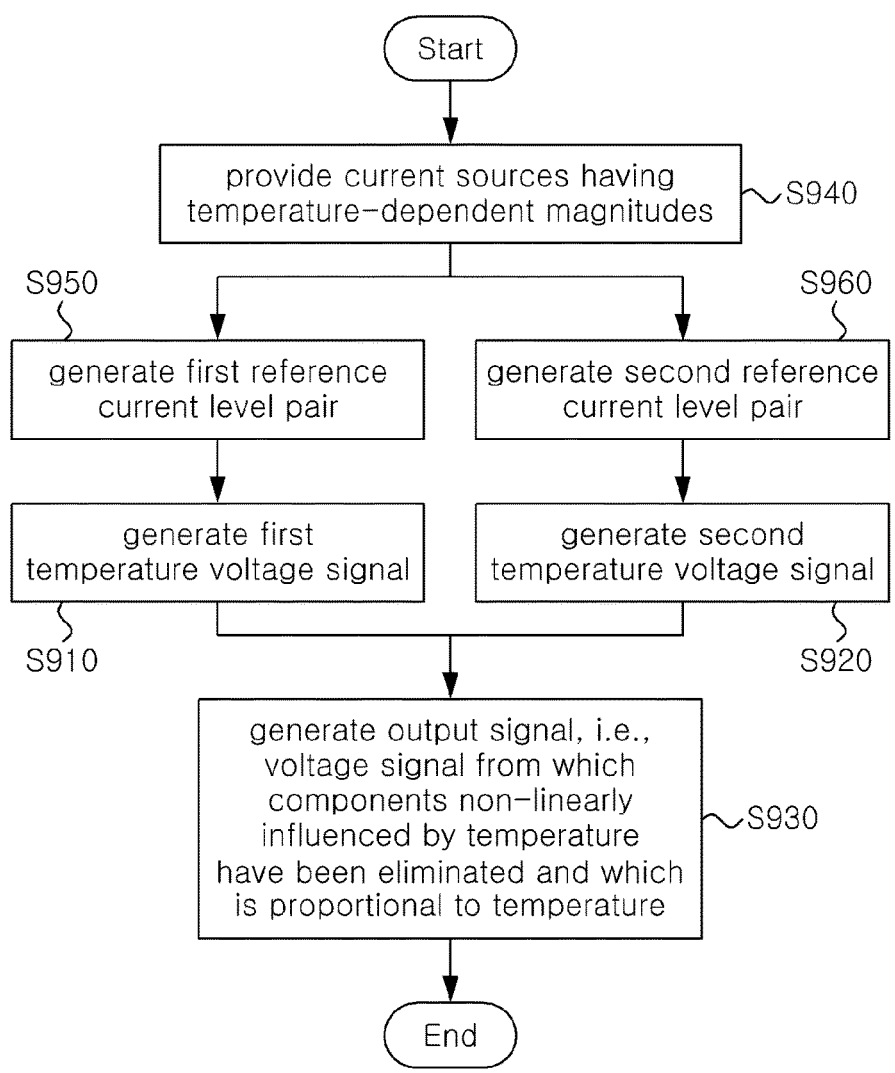
FIG. 11 is an operation flowchart showing a compensation method for a temperature sensor circuit using current sources having temperature-dependent magnitudes according to an embodiment of the present invention.

FIG. 11 is an operation flowchart showing a compensation method for a temperature sensor circuit using current sources having temperature-dependent magnitudes according to an embodiment of the present invention.

The compensation method for a temperature sensor circuit according to the present embodiment includes step S940 of providing current sources having temperature-dependent characteristics, and steps S950 and S960 of generating a first reference current level pair and a second reference current level pair having positive correlations with temperature from the current sources.

The compensation method for a temperature sensor circuit according to the present embodiment further includes step S910 of generating a first temperature voltage signal ΔVBEa having a positive correlation with temperature by means of a first temperature sensor module circuit (a first transistor pair) to which a first reference current level pair I and N×I has been applied, and step S920 of generating a second temperature voltage signal ΔVBEb having a positive correlation with temperature by means of a second temperature sensor module circuit (a second transistor pair) to which a second reference current level pair M×I and M×N×I different from the first reference current level pair has been applied.

Since step S930 shown in FIG. 11 is substantially the same as steps S930 shown in FIGS. 9 and 10, a redundant description thereof is omitted.

According to the present invention, the Early effects of the temperature sensor circuit can be effectively compensated for in a wide operating temperature range in both an analog application and a digital application, thereby obtaining a temperature measurement value at high accuracy.

According to the present invention, the nonlinear error of a temperature-dependent signal, i.e., the output of a temperature sensor, can be compensated for in the analog domain. That is, a linearly temperature-dependent signal can be obtained by directly eliminating nonlinear components in the analog domain, and thus the following additional digital signal processing and the following additional analog or digital circuits can be reduced. Furthermore, according to the present invention, both a nonlinear temperature-dependent component attributable to Early effect and a nonlinear temperature-dependent component attributable to high-level injection effect can be eliminated in the analog domain. Since individual elements in the analog domain are designed with analytical models of nonlinear temperature-dependent components have been incorporated thereto, a linearly temperature-dependent signal can be obtained by a circuit operation in the analog domain during the operation of the actual circuit without a need to analyze nonlinearly temperature-dependent components.

According to the present invention, the degree of freedom in circuit design in connection with the areas of elements, such as a transistor, a resistor, etc., and the like can be significantly increased because the number of factors that should be considered in the design of a temperature sensor circuit is small. For the same reason, the number of constraints in the design of a temperature sensor circuit is small, and thus the performance of a circuit can be easily optimized.

According to the present invention, a temperature sensor circuit can be integrated with an automotive IC, and thus the performance of the automotive IC can be improved in response to changes in temperature.

According to the present invention, there can be provided a temperature sensor circuit that is consistently and linearly proportional to absolute temperature even in an operation condition, such as a high-level injection state. That is, the temperature sensor circuit of the present invention can deal with a wide operation bias condition.

According to the present invention, a linear temperature-dependent signal from which nonlinear components have been eliminated in the analog domain can be provided via two BJT pairs in different bias conditions and an arithmetic operation between the temperature-dependent voltage signals of the BJT pairs, and a compensation method using the circuit.

While the present invention has been described in conjunction with specific details, such as specific elements, and limited embodiments and diagrams above, these are provided merely to help an overall understanding of the present invention. The present invention is not limited to these embodiments, and various modifications and variations can be made based on the foregoing description by those having ordinary knowledge in the art to which the present invention pertains.

Accordingly, the technical spirit of the present invention should not be determined based on only the described embodiments, and the following claims, all equivalents to the claims and equivalent modifications should be construed as falling within the scope of the spirit of the present invention.

What is claimed is:

1. A temperature sensor circuit, comprising:
   a first temperature sensor module circuit configured to generate a first temperature voltage signal, having a positive correlation with temperature, based on a first reference current level;
   a second temperature sensor module circuit configured to generate a second temperature voltage signal, having a positive correlation with the temperature, based on a second reference current level different from the first reference current level; and
   an arithmetic operation circuit configured to generate an output signal as a voltage signal proportional to the temperature using the first temperature voltage signal and the second temperature voltage signal,
   wherein the arithmetic operation circuit generates the output signal, from which components nonlinearly influenced by the temperature included in the first temperature voltage signal and the second temperature voltage signal have been eliminated, by performing an arithmetic operation on the first temperature voltage signal and the second temperature voltage signal.

2. The temperature sensor circuit of claim 1, wherein the second reference current level is a current level that allows the second temperature sensor module circuit to have a high-level injection state.

3. The temperature sensor circuit of claim 1, wherein the components nonlinearly influenced by the temperature comprise components attributable to high-level injection effects respectively corresponding to the first reference current level and the second reference current level.

4. The temperature sensor circuit of claim 1, wherein the components nonlinearly influenced by the temperature comprise components attributable to reverse Early effects respectively corresponding to the first reference current level and the second reference current level.

5. The temperature sensor circuit of claim 1, wherein the arithmetic operation circuit multiplies the first temperature voltage signal by a first coefficient and the second temperature voltage signal by a second coefficient having a value different from that of the first coefficient, and eliminates components nonlinearly influenced by the temperature, by performing an arithmetic operation on the first temperature voltage signal multiplied by the first coefficient and the second temperature voltage signal multiplied by the second coefficient.

6. The temperature sensor circuit of claim 1, wherein the first reference current level has a positive correlation with the temperature by means of a current source having a characteristic of being dependent on the temperature.

7. The temperature sensor circuit of claim 6, wherein the current source having the characteristic of being dependent on the temperature comprises a temperature-dependent component having a quadratic or higher order temperature term.

8. A compensation method for a temperature sensor circuit, the compensation method comprising:
   generating, by a first temperature sensor module circuit to which a first reference current level pair has been applied, a first temperature voltage signal having a positive correlation with temperature;
   generating, by a second temperature sensor module circuit to which a second reference current level pair different from the first reference current level pair has been applied, a second temperature voltage signal having a positive correlation with the temperature; and
   generating an output signal of an arithmetic operation circuit as a voltage signal proportional to the temperature using the first temperature voltage signal and the second temperature voltage signal, from which components nonlinearly influenced by the temperature have been eliminated, by performing an arithmetic operation on the first temperature voltage signal and the second temperature voltage signal.

9. The compensation method of claim 8, wherein the generating the second temperature voltage signal comprises generating the second temperature voltage signal, having a positive correlation with the temperature, based on the second reference current level that allows the second temperature sensor module circuit to have a high-level injection state.

10. The compensation method of claim 8, wherein the generating the output signal comprises:
    multiplying the first temperature voltage signal by a first coefficient;
    multiplying the second temperature voltage signal by a second coefficient having a value different from that of the first coefficient; and
    eliminating components nonlinearly influenced by the temperature, by performing an arithmetic operation between the first temperature voltage signal multiplied by the first coefficient and the second temperature voltage signal multiplied by the second coefficient.

11. The compensation method of claim 8, further comprising providing the first reference current level pair and the second reference current level pair, each having a positive correlation with the temperature, by means of current sources each having a characteristic of being dependent on temperature.

12. The compensation method of claim 8, further comprising providing the second reference current level pair by multiplying the first reference current level pair by a proportional constant.

13. A temperature sensor circuit, comprising:
    a first temperature sensor module circuit configured to:
    include a first transistor configured such that a first reference current is applied thereto via an emitter terminal thereof and a second transistor configured such that a second reference current is applied thereto via an emitter terminal thereof; and
    generate a first temperature voltage signal using a difference between a first base-emitter voltage of the first transistor and a second base-emitter voltage of the second transistor;
    a second temperature sensor module circuit configured to:
    include a third transistor configured such that a third reference current is applied thereto via an emitter terminal thereof and a fourth transistor configured such that a fourth reference current is applied thereto via an emitter terminal thereof; and
    generate a second temperature voltage signal using a difference between a third base-emitter voltage of the third transistor and a fourth base-emitter voltage of the fourth transistor; and
    an arithmetic operation circuit configured to generate an output signal as a voltage signal proportional to temperature based on the first temperature voltage signal and the second temperature voltage signal.

14. The temperature sensor circuit of claim 13, wherein a ratio between the first reference current and the third reference current is equal to a ratio between the second reference current and the fourth reference current, and a ratio between the first reference current and the second reference current is equal to a ratio between the third reference current and the fourth reference current.

15. The temperature sensor circuit of claim 13, wherein:
the arithmetic operation circuit comprises a subtractor configured to perform a subtraction between a signal obtained by multiplying the first temperature voltage signal by a first coefficient and a signal obtained by multiplying the second temperature voltage signal by a second coefficient; and
the first coefficient and the second coefficient have different values.

16. The temperature sensor circuit of claim 13, wherein the first reference current is applied by a current source having a characteristic of being dependent on the temperature.

* * * * *